(12) United States Patent
Kinder (10) Patent No.: US 7,970,758 B2
(45) Date of Patent: Jun. 28, 2011

(54) AUTOMATIC COMPLETION WITH LDAP

(75) Inventor: Nathan G. Kinder, Castro Valley, CA (US)

(73) Assignee: Red Hat, Inc., Raleigh, NC (US)

( * ) Notice: Subject to any disclaimer, the term of this patent is extended or adjusted under 35 U.S.C. 154(b) by 440 days.

(21) Appl. No.: 11/515,239

(22) Filed: Aug. 31, 2006

(65) Prior Publication Data

US 2008/0059428 A1 Mar. 6, 2008

(51) Int. Cl.
  *G06F 7/00* (2006.01)
  *G06F 17/30* (2006.01)
(52) U.S. Cl. .......................... 707/722; 707/758
(58) Field of Classification Search .............. 715/226
  See application file for complete search history.

(56) References Cited

U.S. PATENT DOCUMENTS

| 6,539,379 | B1 |   | 3/2003  | Vora et al.          |         |
|-----------|----|---|---------|----------------------|---------|
| 6,564,213 | B1 | * | 5/2003  | Ortega et al.        | 707/5   |
| 7,313,581 | B1 | * | 12/2007 | Bachmann et al.      | 707/759 |
| 2002/0112017 | A1 | * | 8/2002  | Hall et al.       | 709/213 |
| 2003/0028563 | A1 | * | 2/2003  | Stutz et al.      | 707/513 |
| 2005/0169213 | A1 | * | 8/2005  | Scian et al.      | 370/329 |
| 2005/0283468 | A1 | * | 12/2005 | Kamvar et al.     | 707/3   |
| 2006/0075120 | A1 | * | 4/2006  | Smit               | 709/227 |
| 2006/0173873 | A1 | * | 8/2006  | Prompt et al.     | 707/100 |
| 2006/0224553 | A1 | * | 10/2006 | Chtcherbatchenko et al. | 707/1 |
| 2008/0065617 | A1 | * | 3/2008  | Burke et al.      | 707/5   |

OTHER PUBLICATIONS

Wikipedia, "AJAX", wikipedia.org, Retrieved: Jul. 15, 2008.*
Jeremy Moskowitz, "Bridging the Directory Services Gap", Redmondmag.com, Feb. 2006, 7 pages.
"Overview of Directory Server Architecture", http://directory.fedora.redhat.com/wiki/Architecture, May 3, 2005, 10 pages.

* cited by examiner

*Primary Examiner* — Cam Y T Truong
(74) *Attorney, Agent, or Firm* — Lowenstein Sandler PC (57) ABSTRACT

A method and apparatus for searching data entries in a Lightweight Directory Access Protocol (LDAP) directory is described. At least a portion of an input is received from a user. Entries of a Lightweight Directory Access Protocol (LDAP) directory are searched to identify entries that contain the portion of the input from the user. Information pertaining to the identified entries is returned to the user, wherein the information pertaining to at least one identified entry does not include the portion of the input or a modification of the portion of the input.

17 Claims, 8 Drawing Sheets

AUTOMATIC COMPLETION WITH LDAP

TECHNICAL FIELD

This invention relates to the field of a Lightweight Directory Access Protocol (LDAP), and more specifically to assisting a user in searching entries of an LDAP directory.

BACKGROUND

With the prevalence of networked computer systems, obtaining data can be as convenient and simple as a few mouse clicks on a network-connected computer. However, searching for specific data on the network may not be an easy task especially when a user does not know the correct or complete spelling of the data he or she is looking for. The user may need to take a 'trial-and-error' approach by searching with different spellings of the search term, for example. Further, when the search term contains multiple words, the user may need to enter in a data entry field of a user interface (e.g., a web page on a browser) of a network-connected computer at least the first word and a portion of the second word in order for the computer systems to return search results that closely match what the user is looking for. Therefore, it would be convenient to the user if a list of suggested search terms can be provided, such as in a drop-down menu on the web page, as soon as the user starts entering the beginning of the search term. If the particular search term yet to be completely entered by the user is among those in the suggestion list, all the user needs to do is to select it (e.g., by highlighting the particular search term in the drop-down menu and pressing the ENTER key, or by moving the cursor over the particular search term with a mouse and clicking the mouse) to conduct a search using that particular search term.

Thunderbird, a personal electronic mail application product from Mozilla, provides a user with a list of suggested e-mail addresses after the user has entered the beginning of an e-mail address in the address field. Google Suggest, a tool from Google, provides a user with a fixed number (i.e., ten) of suggested terms. The suggested terms are popular terms searched by users of Google's search engine. The first letter or the first few letters of those suggested terms match the letter or the few letters the user has entered. However, when a user is not searching for an e-mail address or if the search term is not among one of those popular search terms, a user may still have to face the inconvenience previously described.

In a data storage system, such as a Lightweight Directory Access Protocol (LDAP) directory, each of the data entries in the directory may contain one or more attributes describing the data entry. For example, a entry of a person in an LDAP directory may contain the name, the phone number, the e-mail address, and the city where the person's office is located. In this example, the name, the phone number, the e-mail address, and the city is each an attribute of the entry for that person. In some LDAP directory services, to search for data entries containing certain characteristics among a plurality of data entries the user must specify in which attribute of the plurality of data entries the search should be conducted. It would be convenient if a list of suggested data entries can be provided to a user if the user is searching for a particular entry in the directory accessing a number of attributes of the data entries may contain the search term or phrase, as the user begins to enter an alphanumeric character representative of a portion of the search term or phrase.

DESCRIPTION OF THE DRAWINGS

The present invention is illustrated by way of example, and not by way of limitation, in the figures of the accompanying drawings and in which.

DETAILED DESCRIPTION

Described herein is a method and apparatus for assisting a user in searching data entries of a Lightweight Directory Access Protocol (LDAP) directory. The following description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram form in order to avoid unnecessarily obscuring the present invention. Thus, the specific details set forth are merely exemplary. Particular implementations may vary from these exemplary details and still be contemplated to be within the spirit and scope of the present invention.

Embodiments of a method and apparatus are described to assist users in searching data entries of an LDAP directory. The method may include receiving at least a portion of an input from a client and searching stored data in a Lightweight Directory Access Protocol (LDAP) directory to identify which of the stored data contain the portion of the input from the client. The method may also include returning to the client information about stored data in the LDAP directory that may match the user's input, without actually retrieving the stored data from the directory. The information returned to the client may be one or more identifiers, such as data attributes, to assist the client user to select desired data stored in the directory. The portion of the input may be composed of a multiple characters. The directory may be searched as the client user inputs the characters and the information about the stored data can be returned to the client concurrently with the client user inputting the characters. As such, the information returned about the directory data may be considered as occurring in "real-time" or "simultaneous" with the client user's input. The information may be candidate matching data stored in the directory that may be potential intended completions of the user's input. The matching data may be displayed to the user, serving as automatic completions of the input that the user may then select in order to retrieve their desired data stored in the directory. The information returned about the stored data may also be one or more alternative candidate data entries that do not match the portion of the input, but would otherwise result in a match in order to correct for user input errors or variations in the portion of the input such as abbreviations.

Figure 1A:
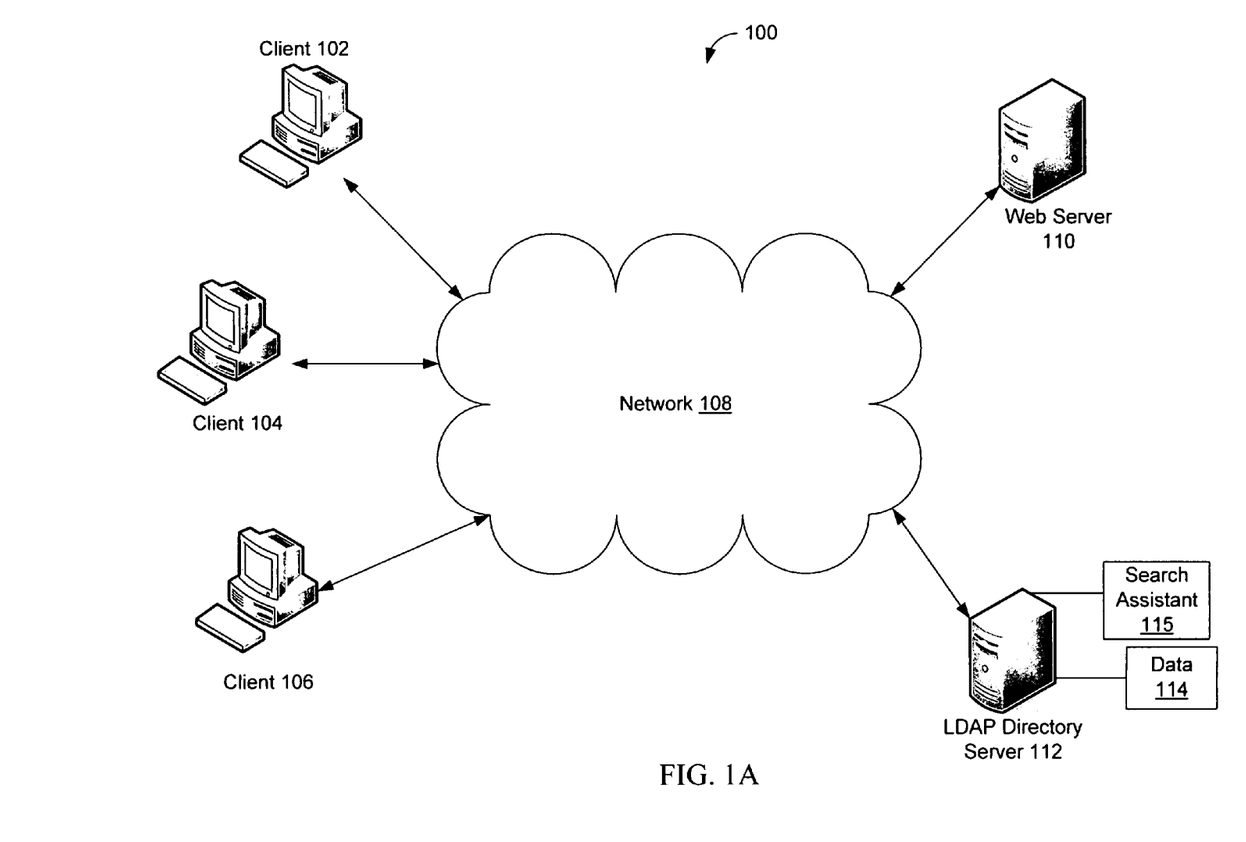
FIG. 1A illustrates a network architecture.

FIG. 1A illustrates an exemplary network architecture 100 in which embodiments of the present invention may operate. The network architecture 100 may include client devices 102, 104 and 106 coupled with a web server (or a set of web servers) 110 and an LDAP directory server (or a set of LDAP directory servers) 112 via a network 108 (e.g., a public network such as the Internet or a private network such as a local area network (LAN)). The client devices 102, 104 and 106 may be, for example, personal computers (PCs), mobile phones, palm-sized computing devices, personal digital assistants (PDAs), etc.

Data 114 may be a directory of data entries, and may be stored in LDAP directory server(s) 112. Alternatively, data 114 may be stored externally to LDAP directory server(s) 112. Upon receiving a request for information from any of the clients 102, 104 and 106, web server 110 retrieves data from LDAP directory server 1112, which in turn retrieves data from its associated LDAP directory of data entries. Alternatively, a request for information from any of the clients 102, 104 and 106 may be sent to and received directly by LDAP directory server 112. LDAP directory server 112 includes a search assistant module 115 that implements processing logic to search data 114 to identify which ones contain a character representative of a portion of an input from a client, as discussed in greater detail below.

Network 108 may be described in a simplified manner as a collection of computer systems (e.g., clients and servers) that are interconnected by transmission lines (or wireless transmissions) and routers/switches to enable the transfer of information among them, as illustrated in FIG. 1A. These computer systems are often modeled by their functions: client-server. In the client-server model, communication generally takes the form of a request from the client to the server asking for an operation to be performed (e.g., request for data). The server performs the work and sends a reply. A client may then retrieve and display the requested information. However, a computer system may operate as both a server and a client.

Client-server systems communicate with each other using a variety of network protocols, such as Transmission Control Protocol/Internet Protocol (TCP/IP) and Integrated Packet Exchange (IPX), and a variety of application protocols, such as Hypertext Transfer Protocol (HTTP) and File Transfer Protocol (FTP). A user typically views the network as a collection of web pages that are typically located on a server at a network site. Each web page may contain text, embedded components such as graphic image files, and address links to other pages referred to as a Uniform Resource Locator (URL). Web pages are viewed using a program called a web browser that resides on a user's client device. The web browser retrieves information from a requested page on a server, interprets the data and formatting commands, and displays the text and special accessory files, such as images, on the user's client device. Web pages may be created using Hypertext Markup Language (HTML) with hypertext and other information to be displayed in a web browser. HTML is used to structure information—denoting certain text as headings, paragraphs, lists and so on—and can be used to described, to certain extent, the appearance and semantics of a document.

LDAP is a networking protocol for querying and modifying directory services running over TCP/IP. An LDAP directory may contain a tree of data entries, each of which comprises a set of named attributes with values. An LDAP directory often reflects various political, geographical, and/or organizational boundaries, depending on the model chosen. An LDAP directory server may contain a server front-end responsible for network communications, plug-ins for server functions (such as access control and replication), a basic directory tree containing server-related data, and a database back-end plug-in responsible for managing the actual storage and retrieval of server data.

Figure 1B:
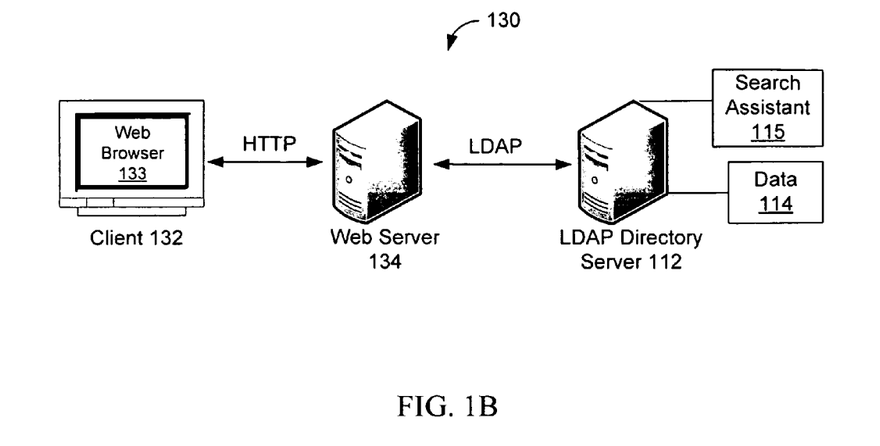
FIG. 1B illustrates one embodiment of a communication link between a network-connected client and a Lightweight Directory Access Protocol (LDAP) directory server.

FIG. 1B illustrates an exemplary communication link 130 in which embodiments of the present invention may operate. In one embodiment, communication link 130 may include a client 132, a web server 134, and an LDAP directory server 112 having access to data 114. Client 132 may host a web browser 133 that communicates with web server 134 using HTTP to request for information. Web server 134 may communicate with LDAP directory server 112 using LDAP to retrieve information in data 114. Data 114 may be stored internally in LDAP directory server 112, or it may be stored externally and accessible by LDAP directory server 112. LDAP directory server 112 receives the request from web server 134, searches the data entries in an LDAP directory in data 114, and returns the search results to web server 134 using search assistant module 115. Web server 134 then forwards the search results to web browser 133 on client 132 using HTTP.

Figure 1C:
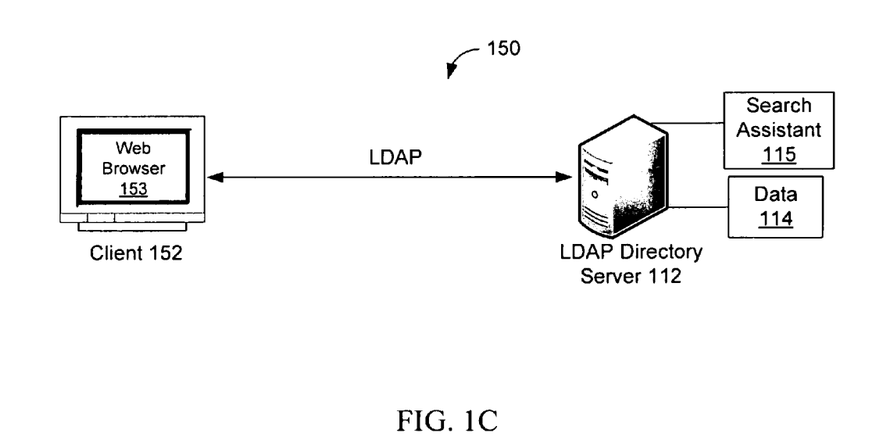
FIG. 1C illustrates an alternative embodiment of a communication link between a network-connected client and an LDAP directory server.

FIG. 1C illustrates another exemplary communication link 150 in which embodiments of the present invention may operate. In one embodiment, communication link 150 may include a client 152 and an LDAP directory server 112 having access to data 114. Client 152 may host a web browser 153 that communicates with LDAP directory server 112 using LDAP to request for information. Data 114 may be stored internally in LDAP directory server 112, or it may be stored externally and accessible by LDAP directory server 112. LDAP directory server 112 receives requests from web browser 153 on client 152, searches the data entries in an LDAP directory in data 114, and returns the search results to web browser 153 on client 152 using search assistant module 115.

Figure 2A:
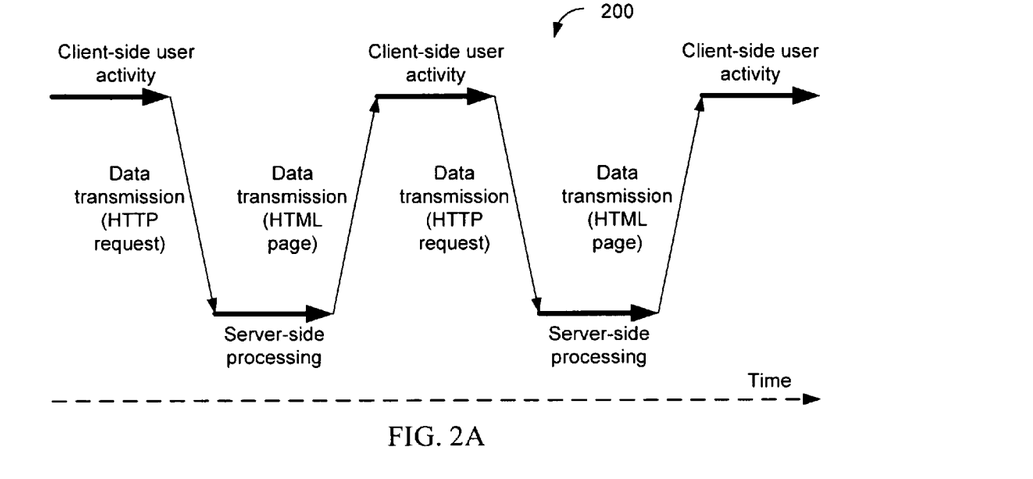
FIG. 2A illustrates a conventional web application client-server interaction model.

FIG. 2A illustrates a web application client-server interaction model 200. As shown in the model 200, client-side user activity on a web application (e.g., web browser) may trigger a data transmission (e.g., sending an HTTP request) to a web server. The web server processes the request—such as retrieving data, communicating with various systems, making calculations, etc.—and then triggers a data transmission (e.g., returning a HTML page) to the client. As the server-side processing takes place, a user on the client side awaits response from the server before the user can proceed further. In such stop-and-go nature of client-server interaction, at every step in a task the user stops and waits for server response.

Figure 2B:
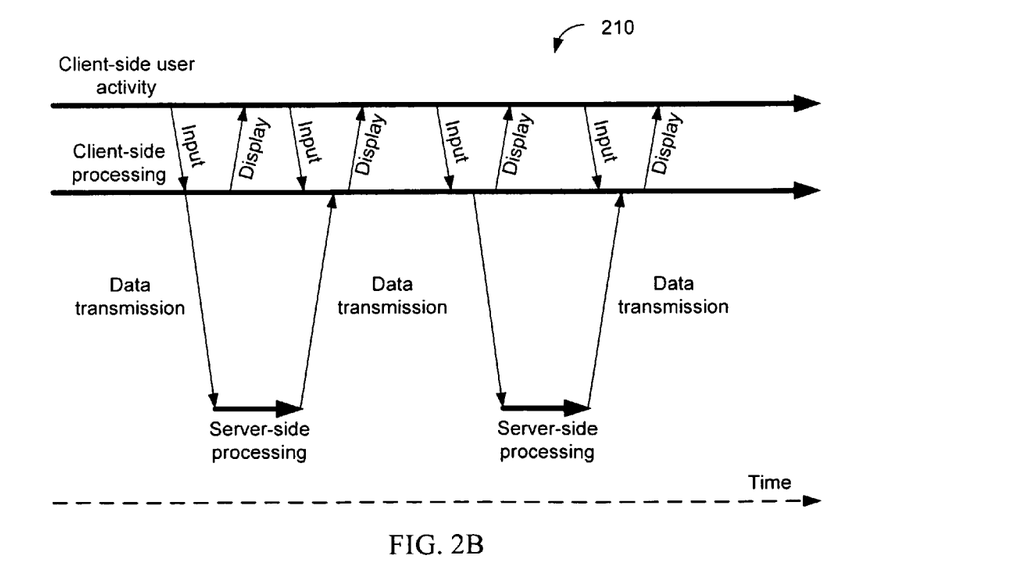
FIG. 2B illustrates a Rich Internet Application (RIA)-enabled web application client-server interaction model.

FIG. 2B illustrates a Rich Internet Application (RIA)-enabled web application client-server interaction model 210 in which embodiments of the present invention may operate. RIAs are web applications that have the features and functionality of traditional desktop applications. An RIA typically transfers the processing necessary for the user interface to the client but keeps the bulk of the data back on the server. In one embodiment, RIA may be implemented by using a computer programming technique known in the art as Asynchronous JavaScript and Extensible Markup Language (AJAX). In alternative embodiments, RIA may be implemented by using JavaScript with Dynamic Hypertext Markup Language (DHTML) or similar techniques/technologies known in the art. An RIA engine (e.g., an AJAX engine) may be installed on the client's web browser. This RIA engine is responsible for both rendering the interface a user sees and communicating with a server on the user's behalf. The RIA engine allows client-side user activity (e.g., the user's interaction with the web application) to take place asynchronously, independent of communication with the server. Where an RIA engine is installed on the client, every user action that normally would generate an HTTP request to a server takes the form of a JavaScript call to the RIA engine instead. The RIA engine may handle any response to a user action that does not require data transmission to the server. If the RIA engine needs information from the server in order to respond to the user, the RIA engine makes requests to the server asynchronously, using Extensible Markup Language (XML) for example, without stalling a user's interaction with the web application. As a result, the user does not have to wait for a response from the server in order to proceed, and client-side user activity can proceed continuously.

Figure 3:
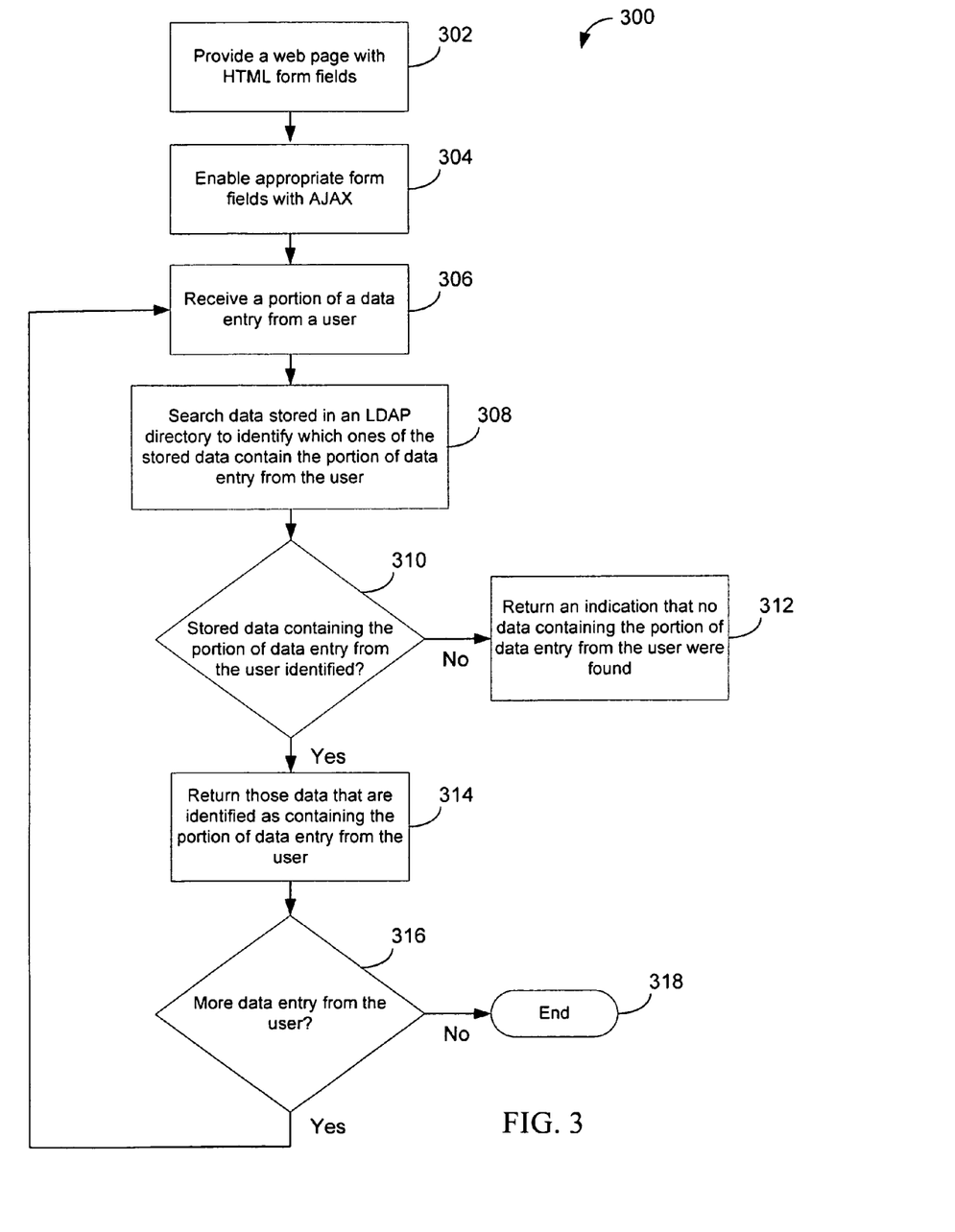
FIG. 3 illustrates one embodiment of automatic completion with LDAP.

FIG. 3 illustrates a flow diagram of one embodiment of a process 300 for retrieving from an LDAP directory those data entries that contain a character representative of a portion of an input by a user. The process may be performed by a search assistant module 115 of LDAP directory server 112 implementing processing logic that may comprise hardware (e.g., circuitry, dedicated logic, programmable logic, microcode, etc.), software (such as instructions run on a processing device), firmware, or a combination thereof.

Referring to FIG. 3, in one embodiment, process 300 begins with providing to a user a web page containing HTML form fields that allow the user to make an input (block 302). At least one or all of the HTML form fields in the web page may be enabled with AJAX (block 304) for automatic completion—such that a portion of the input specified by the user may used to search an LDAP directory with results displayed to the user before the user has completed the entire input. It should be noted that a portion of an input may be a single character or a string of characters. An AJAX engine may be installed on the client to respond to user activity, such as data input, in select HTML form fields of the web page. In an alternative embodiment, RIA techniques/technologies other than AJAX may be used. In one embodiment, as the user begins to make an input (e.g., by pressing a key on the keyboard of a computer system), the AJAX engine may provide a response to the user without sending a request for information to a server. However, if the AJAX engine needs information stored in a directory server, for example an LDAP directory server, it may send a request for the needed information to the directory server. Such request may be sent directly to the directory server or indirectly through a web server.

In one embodiment, the user may enter a search term on a web page to look up certain information. As the user makes a portion of the input (e.g., by pressing the key representative of a portion of a word in the search term), the AJAX engine may forward the portion of the input in a request to an LDAP directory server. As a result, the LDAP directory server receives the portion of the input that was just keyed in by the user (block 306). Then, the LDAP directory server searches the data entries stored in an LDAP directory to identify which ones of the data entries contain the portion of the input specified by the user (block 308). Upon the search, it is determined whether or not data entries containing the portion of the input specified by the user were identified (block 310). If no data entries in the LDAP directory were identified as containing the portion of the specified input, an indication is returned to the client showing that no data entries containing the portion of the specified input were found (block 312). If, however, any data entries were identified as containing the portion of the specified input in the LDAP directory, then they are returned to the client for display to the user (block 314). At block 316, if it is determined that there is no more input from the user, the process ends (block 318). Otherwise, the process repeats by looping back to block 306 to receive an updated portion of the input from the user. It should also be noted that the results may be updated as the user completes the input. One advantage of such an embodiment is that proposed results come from the directory dynamically, thereby providing more efficient and accurate searching. In contrast, conventional search techniques operate by caching previous entries which are displayed to the user as potential matches to their desired data, which may or many not be correct.

In one embodiment, a user interface (UI) may be provided on a client to allow a user make the input for a search and view the search results. FIGS. 4A through 4F illustrate exemplary UIs used for user input and for displaying search results to the user.

Figure 4A:
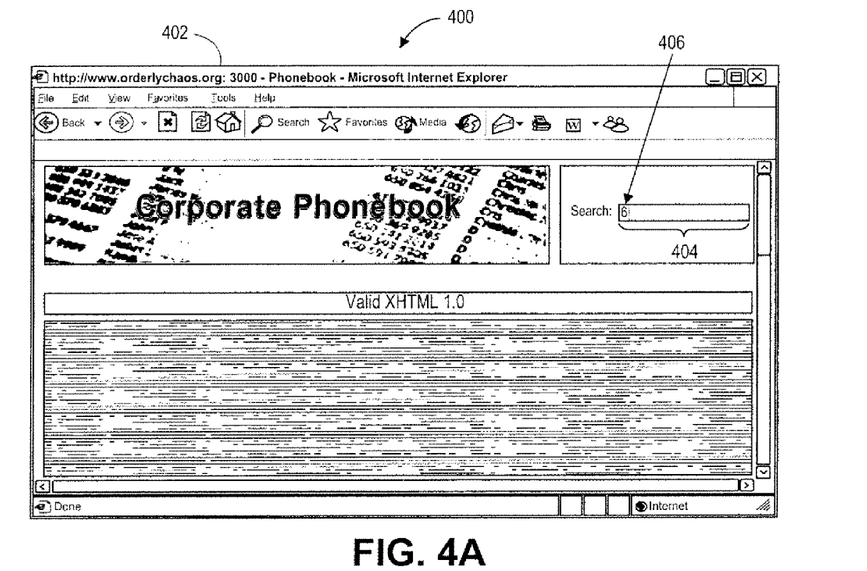
FIGS. 4A-4F illustrate exemplary user interfaces with automatic completion and search results from an LDAP directory.

Referring to FIG. 4A, UI 400 may include a web page 402 having a field (e.g., an HTML form field) 404 for input. In alternative embodiments, UI 400 may contain one or more fields 404, at least one or all of which may be enabled for automatic completion. In one embodiment, the data entered in form field 404 may be a search term. In an alternative embodiment, the data entered in form field 404 may be an attribute of a entry in an LDAP directory. For example, in an LDAP directory containing a corporate phonebook, the data in the directory may be data of individual employees of the organization. Accordingly, data associated with an employee may contain the employee's name, phone number, e-mail address, and/or office location, each of which is an attribute of the data associated with the employee. Thus, in this example, an alphanumeric character 406 entered by a user in HTML form field 404 may be a portion of an employee's name, phone number, e-mail address, or office location. In one embodiment, alphanumeric character 406 may be the first character of an attribute (e.g., such as the letter "j" in the name "John"). Alternatively, alphanumeric character 406 may be any portion of an attribute (e.g., the number "6" in the phone number of "555-3067"). As illustrated in FIG. 4A, the alphanumeric character 406 entered in HTML form field 404 represents a portion of the phone number of an employee in a corporate phonebook directory.

Figure 4B:
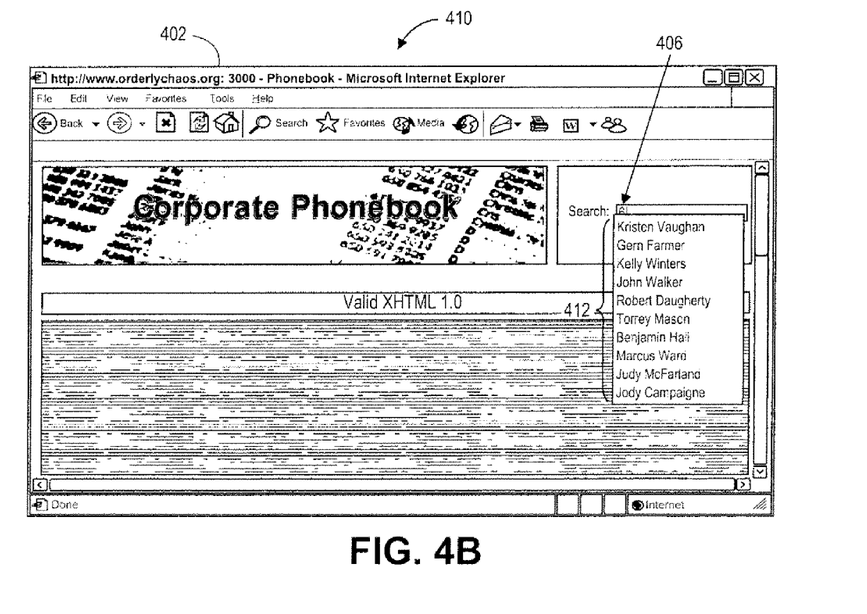

Referring to FIG. 4B, after a user has entered an alphanumeric character 406 in HTML form field 404, a drop-down menu 412 appears in UI 410 with information about the data being search for in the directory. The alphanumeric character 406 may be a portion of the input that the user has yet to finish entering in HTML form field 404 or the complete input. As illustrated in UI 410, drop-down menu 412 contains information about the data being search for in the directory, such as a list of data identified as those data in the LDAP directory that contain the alphanumeric character 406. In one embodiment, drop-down menu 412 may display a list of a specific portion of those data identified as containing alphanumeric character 406, where the specific portion of each of the data entries shown in drop-down menu 412 is the portion of each of the data that actually contains the alphanumeric character 406. In an alternative embodiment, drop-down menu 412 may display a list of a predetermined portion of those data regardless of whether the predetermined portion of the data entries actually contains the alphanumeric character 406.

As an example, alphanumeric character 406 may be a portion of a phone number, and drop-down menu 412 may display a list of phone numbers each of which containing the alphanumeric character 406; and the phone numbers displayed are a specific portion of those data entries identified as containing the alphanumeric character 406. Alternatively, for example, alphanumeric character 406 may be a portion of a phone number while drop-down menu 412 may display a list of the names of those employees whose phone numbers contain the alphanumeric character 406; and the names displayed are a predetermined portion of those data entries identified as containing the alphanumeric character 406.

As illustrated in FIG. 4B, after a user has entered alphanumeric character 406 (e.g., the alphanumeric character "6") in field 404, a drop-down menu 412 containing a list of names of those employees whose phone numbers contain the alphanumeric character 406 is displayed in web page 402. As described previously in regards to FIG. 2B, the display of a list of data entries in a drop-down menu 412 may be the result of an RIA engine fetching and processing the necessary data from a directory server. At such time, the user may select one of the data entries if one of those data entries is what the user was looking for. Alternatively, the user may choose to continue to enter one or more alphanumeric characters in form field 404 to refine the search, especially if the list displayed in drop-down menu 412 contains a large number of data entries for the user to choose from.

Figure 4C:
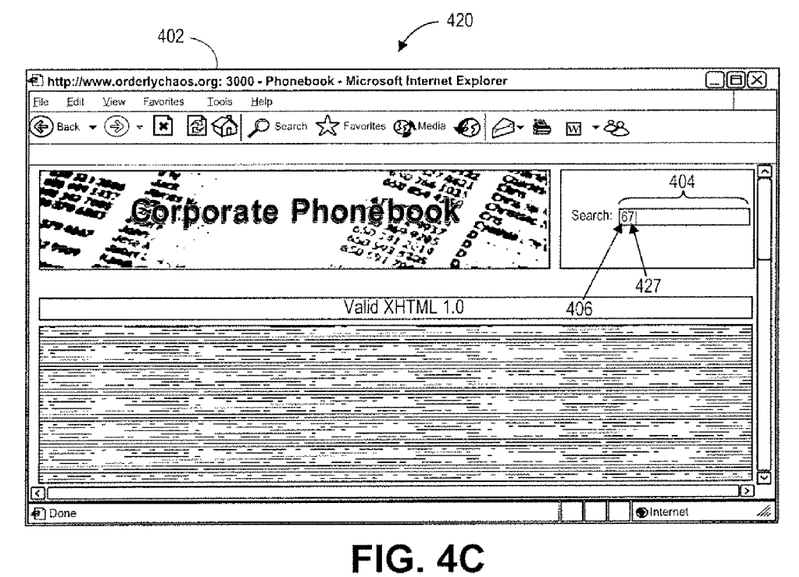

Referring to FIG. 4C, UI 420 contains a filed 404 displaying a first alphanumeric character 406 and a second alphanumeric character 427 entered by a user. The combination of alphanumeric characters 406 and 427 may constitute a portion of a input to be made by the user or it may be the complete input.

Figure 4D:
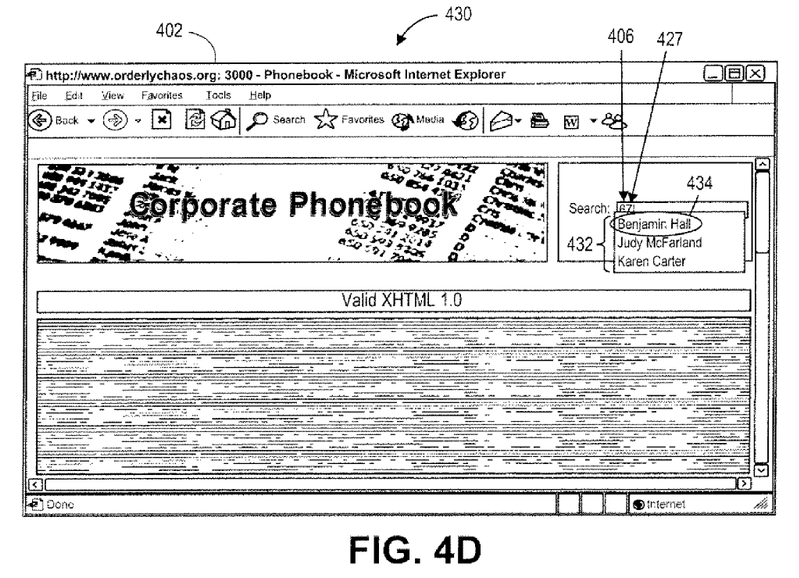

Referring to FIG. 4D, after the user has entered alphanumeric characters 406 and 427, a drop-down menu 432 in UI 430 displays a refined list of data entries that are identified as containing the combination of alphanumeric characters 406 and 427. The list of data entries displayed in drop-down menu 432 may be a subset of those data entries displayed in drop-down menu 412 when the user had only entered alphanumeric character 406. In one embodiment, the list of data entries displayed in drop-down menu 432 may be the result of a search in the LDAP directory. In an alternative embodiment, the list of data entries displayed in drop-down menu 432 may be the result of a search performed locally on the client by an RIA engine, for example, an AJAX engine. AJAX programming and AJAX engine are known by those of ordinary skill in the art; and accordingly, additional details regarding their operation have not been included so as to not obscure the present embodiments. It should be noted that the data need not be actually retrieved from the LDAP directory.

Figure 4E:
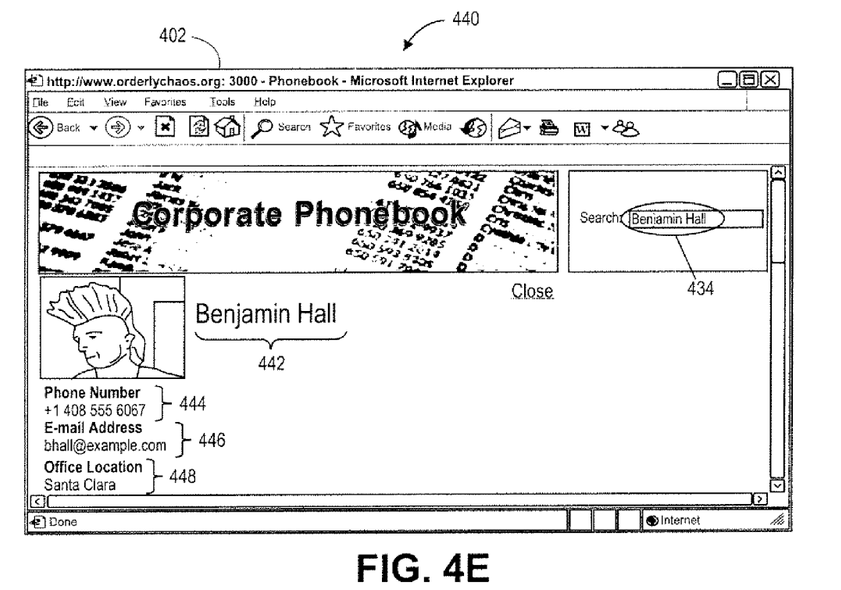

Referring to FIG. 4E, UI 440 displays the information of an input 434 after the user has selected entry 434 from the list of data entries displayed in a drop-down menu. For example, a user may select one of the names displayed in a drop-down menu 432 as that particular name may contain the information the user was looking for. As illustrated in FIG. 4E, upon selection of entry 434 by the user, all the attributes of entry 434 are displayed in UI 440. As an example, the selected entry 434 may contain the 'name' attribute 442, the 'phone number' attribute 444, the 'e-mail address' attribute 446, and the 'office location' attribute 448. In the example shown, the predetermined portion of the data entries displayed in HTML form field 404 is the 'name' attribute of the data entries although the alphanumeric characters entered by the user (for example, the alphanumeric characters "6" and "7") are a portion of the 'phone number' attribute of the data entries.

Figure 4F:
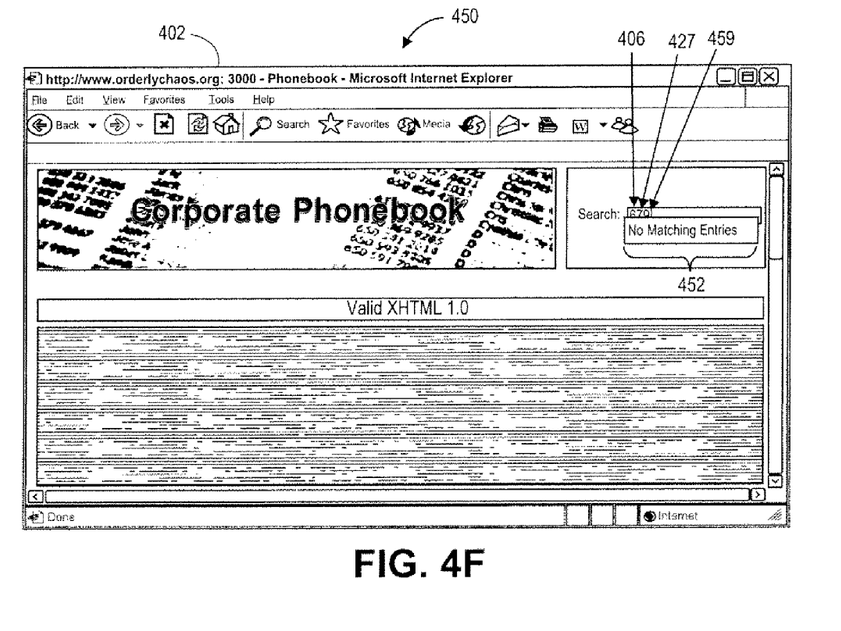

Referring to FIG. 4F, UI 450 contains a message 452 indicating no entries were found when no entries containing the portion of the input by the user (e.g., the combination of the alphanumeric characters) were identified in the LDAP directory. For example, upon a search after the user has entered alphanumeric characters 406, 427 and 459, it may be determined that there is no entry in the LDAP directory that contains the combination of alphanumeric characters 406, 427 and 459. Consequently, as an example, a 'No Matching Entries' message 452 is displayed in UI 450.

In one embodiment, the information returned about the stored data may include one or more alternative candidate entries that do not match the portion of the user input, but would otherwise result in a match in order to correct for user input errors or variations in the portion of the input such as abbreviations. For example, if the portion of the data entered by the user is 'john', then the information returned to the client may include alternative candidate names such as 'ron' or 'jon'. As another example, if the portion of the data entered by the user is a known abbreviation such as 'mtn view', then the information returned to the client may be a more complete spelling such as 'mountain view.'

Figure 5:
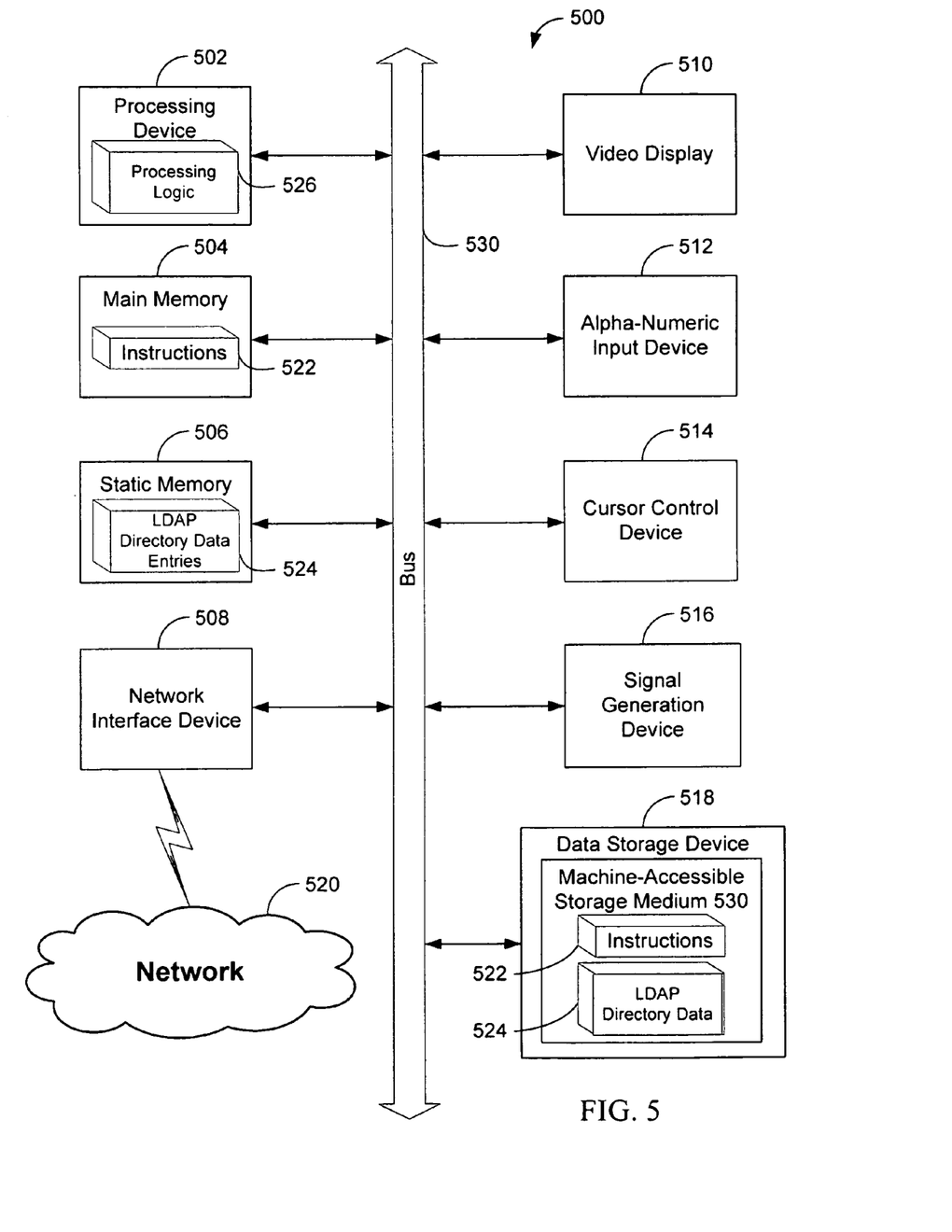
FIG. 5 illustrates a block diagram of one embodiment of a computer system.

FIG. 5 illustrates a diagrammatic representation of a machine in the exemplary form of a computer system 500 within which a set of instructions, for causing the machine to perform any one or more of the method steps discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device 502, a main memory 504 (e.g., read-only memory (ROM), flash memory, dynamic random access memory (DRAM) such as synchronous DRAM (SDRAM), a static memory 506 (e.g., flash memory, static random access memory (SRAM), etc.), and a data storage device 518, which communicate with each other via a bus 530.

Processing device 502 represents one or more general-purpose processing devices such as a microprocessor, central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute the processing logic 526 for performing the operations and steps discussed herein. For example, processing logic 526 may perform operations to receive a character representative of a portion of the input, to search a plurality of data entries in an LDAP directory to identify which ones of the plurality of data entries contain the character, and to return the ones of the plurality of data entries that are identified as containing the character. If no data entries containing the character were identified, processing logic 526 may return an indication that no data entries were found.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a machine-accessible storage medium 530 on which is stored one or more sets of instructions (e.g., software 522) embodying any one or more of the methodologies or functions described herein. The software 522 may also reside, completely or at least partially, within the main memory 504 and/or within the processing device 502 during execution thereof by the computer system 500, the main memory 504 and the processing device 502 also constituting machine-accessible storage media. The software 522 may further be transmitted or received over a network 520 via the network interface device 508.

The machine-accessible storage medium 530 may also be used to store LDAP directory data entries 524. LDAP directory data entries 524 may also be stored in other sections of computer system 500, such as static memory 506.

While the machine-accessible storage medium 530 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing instructions for execution by the machine and that cause the machine to perform any one or more of the methodologies of the present invention. The term "machine-accessible storage medium" shall accordingly be taken to include, but not be limited to, solid-state memories, optical and magnetic media.

Thus, a method and apparatus for retrieving information about data stored in an LDAP directory that contain at least a portion of input by a user have been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method, implemented by a client computing device programmed to perform steps comprising:
    presenting, by a Rich Internet Application (RIA) engine installed in a browser executing on the client computing device, a user interface of a web application;
    receiving at least a portion of an input from a user at the client computing device via a form field of the user interface, wherein the form field is enabled with Asynchronous JavaScript and Extensible Markup Language (AJAX) that allows user interaction with the web application to occur asynchronously with results being displayed to the user before the user has completed an entire input;
    creating, by the RIA engine, a query comprising a portion of the input;
    sending, by the RIA engine, the query directly to a Lightweight Directory Access Protocol (LDAP) directory server from the client computing device, wherein said sending is performed asynchronously with said receiving before the user has completed the entire input, and wherein the query causes the LDAP directory server to search entries of the LDAP directory to identify entries that contain the portion of the input from the user;
    receiving, by the RIA engine, a response to the query directly from the LDAP directory server, the response including information pertaining to the identified entries;
    returning to the user the information pertaining to the identified entries via the user interface, wherein the information includes data from one or more predetermined attributes, and wherein for at least one identified entry one of the predetermined attributes is not an attribute that contained the portion of the input from the user;
    receiving an updated portion of the input from the user via the user interface;
    creating, by the RIA engine, an updated query comprising the updated portion of the input;
    sending, by the RIA engine, the updated query directly to the LDAP directory server, wherein said sending the updated query is performed asynchronously with said receiving the updated portion before the user has completed the entire input, wherein the updated query causes the LDAP directory server to search the identified entries of the LDAP directory to determine which of the identified entries contain the updated portion;
    receiving, by the RIA engine, an updated response to the updated query directly from the LDAP directory server, the updated response including additional information pertaining to the identified entries that contain the updated portion; and
    returning to the user the additional information about the identified entries that contain the updated portion via the user interface without retrieving the identified entries from the directory.

2. The method of claim 1, wherein the information pertaining to the identified entries is returned to the user without retrieving the identified entries from the directory.

3. The method of claim 1, wherein the portion of the input comprises a plurality of characters and wherein the information pertaining to the identified entries is returned to the user concurrently with the user inputting the plurality of characters.

4. The method of claim 3, wherein the information is an attribute of one or more identified entries to assist the user to select data stored in the directory.

5. The method of claim 1, wherein the information is one or more identified entries that match the input.

6. The method of claim 1, further comprising returning to the user a message indicating that no entries were found to contain the portion.

7. The method of claim 1, wherein if there is only one identified entry that matches the portion, the method further comprises retrieving the one matching entry from the directory.

8. The method of claim 1, wherein returning to the user information about the identified entries comprises providing an alternative input that does not match the portion of the input.

9. The method of claim 1, wherein returning to the user information about the identified entries comprises providing a variation to the portion of the input.

10. The method of claim 1, wherein the LDAP directory server to search the entries asynchronously with said receiving the updated portion of the input.

11. The method of claim 1, wherein the LDAP directory server to search the entries asynchronously with said returning to the user information pertaining to the identified entries.

12. An article of manufacture, comprising:
a machine-accessible storage medium including data that, when accessed by a machine, cause the machine to perform operations comprising:
presenting, by a Rich Internet Application (RIA) engine installed in a browser executing on a client computing device, a user interface of a web application;
receiving at least a portion of an input from a user at the client computing device via a form field of the user interface, wherein the form field is enabled with Asynchronous JavaScript and Extensible Markup Language (AJAX) that allows the user's interaction with the web application to occur asynchronously with results being displayed to the user before the user has completed an entire input;
creating, by the RIA engine, a query comprising the portion of the input;
sending, by the RIA engine, the query directly to a Lightweight Directory Access Protocol (LDAP) directory server from the client computing device, wherein said sending is performed asynchronously with said receiving before the user has completed the entire input, and wherein the query causes the LDAP directory server to search entries of the LDAP directory to identify entries that contain the portion of the input from the user;
receiving, by the RIA engine, a response to the query directly from the LDAP directory server, the response including information pertaining to the identified entries;
returning to the user the information that indicates the identified entries of the LDAP directory via the user interface, wherein the information includes data from one or more predetermined attributes, and wherein for at least one identified entry one of the predetermined attributes is not an attribute that contained the portion of the input from the user;
receiving an updated portion of the input from the user via the user interface;
creating, by the RIA engine, an updated query comprising the updated portion of the input;
sending, by the RIA engine, the updated query directly to the LDAP directory server, wherein said sending the updated query is performed asynchronously with said receiving the updated portion before the user has completed the entire input, wherein the updated query causes the LDAP directory server to search the identified entries of the LDAP directory to determine which of the identified entries contain the updated portion;
receiving, by the RIA engine, an updated response to the updated query directly from the LDAP directory server, the updated response including additional information pertaining to the identified entries that contain the updated portion; and
returning to the user the additional information about the identified entries that contain the updated portion via the user interface without retrieving the identified entries from the directory.

13. The article of manufacture of claim 12, wherein the machine-accessible storage medium further includes data that, when accessed by a machine, cause the machine to perform operations comprising providing to the user one or more proposed completions to the portion of the input based on the returned information.

14. The article of manufacture of claim 12, wherein the machine-accessible storage medium further includes data that, when accessed by a machine, cause the machine to perform operations comprising providing to the user proposed completions concurrently as the user enters the input.

15. An apparatus, comprising:
a memory to store instructions for a user interface that includes a rich internet application (RIA) engine; and
a processor, connected with the memory, to execute the instructions, wherein the instructions cause the processor to:
provide, by the RIA engine, a form field to a user, wherein the form field is enabled with Asynchronous JavaScript and Extensible Markup Language (AJAX) that allows user interaction with the web application to occur asynchronously with results being displayed to the user before the user has completed an entire input;
receive, by the RIA engine, at least a portion of an input from the user via the form field;
create, by the RIA engine, a query comprising the portion of the input;
send, by the RIA engine, the query directly to a Lightweight Directory Access Protocol (LDAP) directory server, wherein said sending is performed asynchronously with said receiving before the user has completed the entire input, and wherein the query causes the LDAP directory server to search entries of the LDAP directory to identify entries that contain the portion of the input from the user;
receive, by the RIA engine, a response to the query directly from the LDAP directory server, the response including information pertaining to the identified entries;
return to the user the information pertaining to the identified entries via the user interface, wherein the information includes data from one or more predetermined attributes, and wherein for at least one identified entry one of the predetermined attributes is not an attribute that contained the portion of the input from the user;
receive an updated portion of the input from the user via the user interface;
create, by the RIA engine, an updated query comprising the updated portion of the input;
send, by the RIA engine, the updated query directly to the LDAP directory server, wherein said sending the updated query is performed asynchronously with said receiving the updated portion before the user has completed the entire input, wherein the updated query causes the LDAP directory server to search the identified entries of the LDAP directory to determine which of the identified entries contain the updated portion;
receive, by the RIA engine, an updated response to the updated query directly from the LDAP directory server, the updated response including additional information pertaining to the identified entries that contain the updated portion; and
return to the user the additional information about the identified entries that contain the updated portion via the user interface without retrieving the identified entries from the directory.

16. The apparatus of claim 15, further comprising the instructions to cause the processor to return the information to the user without retrieving the identified entries from the LDAP directory.

17. The apparatus of claim 15, further comprising the instructions to cause the processor to provide proposed completions to the user concurrently as the user enters the input.

* * * * *